No. 682,017. Patented Sept. 3, 1901.
H. L. ALDIS.
PHOTOGRAPHIC LENS.
(Application filed Feb. 4, 1901.)
(No Model.)
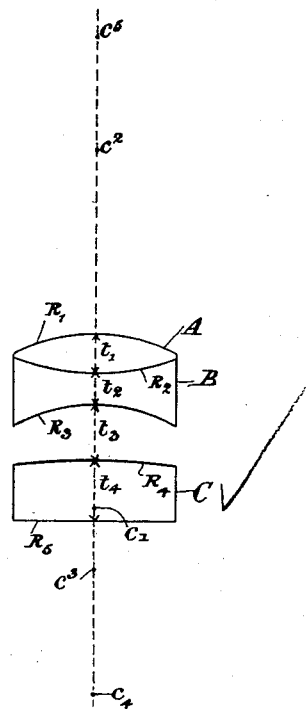

UNITED STATES PATENT OFFICE.

HUGH LANCELOT ALDIS, OF COUNTY OF MIDDLESEX, ENGLAND.

PHOTOGRAPHIC LENS.

SPECIFICATION forming part of Letters Patent No. 682,017, dated September 3, 1901.

Application filed February 4, 1901. Serial No. 45,900. (No model.)

*To all whom it may concern:*

Be it known that I, HUGH LANCELOT ALDIS, optician, a subject of the Queen of Great Britain, residing at 65 Lauderdale Mansions, Lauderdale road, in the county of Middlesex, England, have invented certain new and useful Improvements Relating to Photographic Lenses, of which the following is a specification.

The object of this invention is with the greatest simplicity to correct the five spherical aberrations known as, first, ordinary spherical aberration; second, coma; third, curvature of field; fourth, astigmatism; fifth, distortion, and also the two chromatic aberrations; sixth, longitudinal chromatic aberration; seventh, chromatic error of magnification. For this purpose I employ a doublet composed of two components—viz., one component a cemented combination of long focus (either slightly positive or slightly negative) formed of a converging-lens cemented to a diverging-lens of slightly-higher refractive index; the second component a converging-lens of high refractive index.

The drawing shows a lens constructed according to this invention. Preferably the top is the front; but it also works well the other way.

The compound lens is made up of three glasses A, B, and C, A and B being cemented together.

$c'$ is the center of the outer face of A, and $R'$ is its radius.

$c^2$ is the center of the cemented faces of A and B, and $R^2$ is their radius.

$c^3$ is the center of the inner face of B, and $R^3$ is its radius.

$c^4$ is the center of the inner face of C, and $R^4$ is its radius.

$c^5$ is the center of the outer face of C, and $R^5$ is its radius.

$t'$, $t^2$, and $t^4$ are the thicknesses of A, B, and C, respectively, and $t^3$ is the distance between the centers of the inner surfaces of B and C.

The drawing is to scale, but the centers $c^4$ and $c^5$ are shown much nearer to the lens than they really are The refractive indices of the glasses employed for the lenses A, B, and C are—

|   | D line. | Hy line. |
|---|---|---|
| A | 1.5366 | 1.5508 |
| B | 1.5738 | 1.5920 |
| C | 1.6014 | 1.6199 |

Assuming the focal length of the whole combination to be unity, then the radii of the various faces are—

$R' = -\ .1356$      $R^4 = -\ .4861$
$R^2 = +\ .1750$      $R^5 = +10.09$
$R^3 = -\ .1276$ and the thicknesses of the lenses and of the air-space are—

$t' = .0306$      $t^3 = .0425$
$t^2 = .025$      $t^4 = .0587$

For the purpose of attaining the object of this invention it is essential that in addition to the employment of glasses of varying indices of refraction, as hereinbefore described, there shall be five refractive surfaces (of which three are positive or light-converging and two negative or light-diverging) and that the apparent centers of such surfaces, taken in the order in which they occur along the optical axis of the system, shall correspond with a positive and a negative surface alternately. Thus, counting from the top to the bottom of the drawing, $c^5$ is the apparent center of the positive or converging surface $R^5$. $c^2$ is the apparent center of the negative or diverging surface $R^2$. $c'$ is the apparent center of the positive or converging surface $R'$. $c^3$ is the apparent center of the negative or diverging surface $R^3$. $c^4$ is the apparent center of the positive or converging surface $R^4$.

By the term "apparent center" in the foregoing description I mean the position at which the true center of a refracting-surface will appear to the eye of an observer looking through the system.

By the employment of not less than five refracting-surfaces having the aforesaid order or disposition of the apparent centers on the optical axis the aberrations hereinbefore referred to are simultaneously corrected, so that the image produced by the combined system of lenses is free from the same.

What I claim is—

1. The combination of a component consisting of a converging-lens and a diverging-lens cemented together, and a second component consisting of one double convex lens the radius of curvature of each of the two faces of the second component being greater than the radius of curvature of any face of the first component, and the radius of curvature of the outer face of the second component being greater than that of its inner face.

2. The combination of a component consisting of a converging-lens and a diverging-lens cemented together, and a second component consisting of one double convex lens the radius of curvature of each of the two faces of the second component being greater than the radius of curvature of any face of the first component, the radius of curvature of the outer face of the second component being greater than that of its inner face, and the apparent centers of curvature of the faces being in the order: center of outer face of second component, center of cemented faces of first component, center of outer face of first component, center of inner face of first component, and center of inner face of second component.

3. The combination of a component consisting of a converging-lens and a diverging-lens cemented together, and a second component consisting of one double convex lens the radius of curvature of each of the two faces of the second component being greater than the radius of curvature of any face of the first component, the radius of curvature of the outer face of the second component being greater than that of its inner face, the radius of curvature of the cemented faces of the first component being greater than that of either of its other two faces, and the radius of curvature of its outer face being greater than that of its inner face.

4. The combination of a component consisting of a converging-lens and a diverging-lens cemented together, and a second component consisting of one double convex lens the radius of curvature of each of the two faces of the second component being greater than the radius of curvature of any face of the first component, the radius of curvature of the outer face of the second component being greater than that of its inner face, the radius of curvature of the cemented faces of the first component being greater than that of either of its other two faces, the radius of curvature of its outer face being greater than that of its inner face, and the apparent centers of curvature of the faces being in the order: center of outer face of second component, center of cemented faces of first component, center of outer face of first component, center of inner face of first component, and center of inner face of second component.

5. The combination of a component consisting of a converging-lens and a diverging-lens cemented together, and a second component consisting of one double convex lens the radius of curvature of each of the two faces of the second component being greater than the radius of curvature of any face of the first component, the radius of curvature of the outer face of the second component being greater than that of its inner face, the refractive index of the diverging-lens of the first component being higher than that of its converging-lens.

6. The combination of a component consisting of a converging-lens and a diverging-lens cemented together, and a second component consisting of one double convex lens the radius of curvature of each of the two faces of the second component being greater than the radius of curvature of any face of the first component, the radius of curvature of the outer face of the second component being greater than that of its inner face, and the apparent centers of curvature of the faces being in the order: center of outer face of second component, center of cemented faces of first component, center of outer face of first component, center of inner face of first component, center of inner face of second component, the refractive index of the diverging-lens of the first component being higher than that of its converging-lens.

7. The combination of a component consisting of a converging-lens and a diverging-lens cemented together, and a second component consisting of one double convex lens the radius of curvature of each of the two faces of the second component being greater than the radius of curvature of any face of the first component, the radius of curvature of the outer face of the second component being greater than that of its inner face, the radius of curvature of the cemented faces of the first component being greater than that of either of its other two faces, the radius of curvature of its outer face being greater than that of its inner face, the refractive index of the diverging-lens of the first component being higher than that of its converging-lens.

8. The combination of a component consisting of a converging-lens and a diverging-lens cemented together, and a second component consisting of one double convex lens the radius of curvature of each of the two faces of the second component being greater than the radius of curvature of any face of the first component, the radius of curvature of the outer face of the second component being greater than that of its inner face, the radius of curvature of the cemented faces of the first component being greater than that of either of its other two faces, the radius of curvature of its outer face being greater than that of its inner face, and the apparent centers of curvature of the faces being in the order: center of outer face of second component, center of cemented faces of first component, center of outer face of first component, center of inner face of first component, center of inner face of second component, the refractive index of the diverging-lens of the first component being higher than that of its converging-lens.

HUGH LANCELOT ALDIS.

Witnesses:
  FREDK. C. WEATHERLY,
  H. A. MARSHALL.